United States Patent [19] [11] 4,409,542
Becker et al. [45] Oct. 11, 1983

[54] MONITORING SYSTEM FOR AN LC FILTER CIRCUIT IN AN AC POWER NETWORK

[75] Inventors: Michael Becker, Uttenreuth; Alfons Fendt, Erlangen; Dusan Povh, Nuremberg; Klaus Renz, Fürth; Gerhard Schuch, Erlangen; Hermann Waldmann, Weiher, all of Fed. Rep. of Germany

[73] Assignee: Siemens Aktiengesellschaft, Munich, Fed. Rep. of Germany

[21] Appl. No.: 266,279

[22] Filed: May 26, 1981

[30] Foreign Application Priority Data

May 27, 1980 [DE] Fed. Rep. of Germany ....... 3020107

[51] Int. Cl.³ ............................................ G01R 27/00
[52] U.S. Cl. .............................. 324/57 Q; 324/60 C; 324/434
[58] Field of Search ...................... 324/57 Q, 57 R, 51, 324/60 C, 60 R, 426, 427, 430, 434

[56] References Cited

U.S. PATENT DOCUMENTS 3,200,392  8/1965  Chumakov .................. 324/51 X
3,466,538  9/1969  Becker et al. ............... 324/57 R
3,735,250  5/1973  Masui ........................ 324/51
3,832,631  8/1974  Koga et al. .................. 324/57 Q X
4,243,933  1/1981  Rollman ...................... 324/60 C X

FOREIGN PATENT DOCUMENTS

52-75472   6/1977  Japan ......................... 324/427
55-147367 11/1980  Japan ......................... 324/427

Primary Examiner—Stanley T. Krawczewicz
Attorney, Agent, or Firm—Kenyon & Kenyon

[57] ABSTRACT

A monitoring system for measuring the phase currents of a filter circuit, the monitoring system having current measuring transformers coupled to respective filter sections for suppressing the harmonic content. Voltage measuring transformers are provided for measuring the network phase voltages, each such voltage measuring transformer being coupled to an electronic filter simulator and a filtering section for suppressing harmonic content. The fundamental frequency component of the measured phase currents and the simulated phase currents are conducted to transient comparator circuitry which is coupled to indicating and triggering circuitry having individual counter stages. Only rapid variations between the measured and simulated phase currents will result in fault indications, thereby preventing false indications resulting from variations in temperature.

5 Claims, 9 Drawing Figures

FIG 7

MONITORING SYSTEM FOR AN LC FILTER CIRCUIT IN AN AC POWER NETWORK

BACKGROUND OF THE INVENTION

This invention relates generally to systems for monitoring capacitors batteries, and more particularly, to a system for monitoring a capacitor battery in an LC filter circuit of an AC power network, the capacitor battery being of the type formed of a plurality of parallel legs each having a plurality of sectional capacitors connected in series with fuses, adjacent ones of the sectional capacitors being connected to one another by cross lines.

The generation of multi-phase rotary voltages, such as are produced by converters, produce a line frequency fundamental component on which are superimposed characteristic harmonics. Filtering is generally achieved by using filters which are tuned to the frequencies of the characteristic harmonics. At the fundamental frequency, such filter circuits appear as capacitive impedances.

The capacitances of filter circuits are generally formed of a capacitor battery having a plurality of parallel legs, each such leg having a plurality of sectional capacitors which are each connected in series with a respective fuse. Sectional capacitors in adjacent legs are interconnected by continuous cross lines. Thus, a multiplicity of sectional capacitors may be contained within a capacitor battery. In fault situations where a sectional capacitor short circuits, adjacent ones of the interconnected sectional capacitors discharge via the cross lines to the fuse which is connected in series with the defective sectional capacitor, causing the fuse to open circuit. Such a failure of a sectional capacitor causes the overall filter circuit to become detuned. However, such detuning results in only slight change in the filter current at the fundamental frequency component, thereby rendering detection of defect in a single sectional capacitor to be difficult to perform with known current monitoring and measuring systems. This problem is further compounded by the fact that variations in the filter circuit resulting from changes in the ambient temperature may be greater than the current changes which occur as a result of the failure of one or more sectional capacitors.

Although the harmonic content of the filter current changes substantially more than the fundamental component when a sectional capacitor fails, such variations in the harmonic content of the filter current are not suitable for evaluation to determine the failure of sectional capacitors because the harmonic content varies greatly with the control angle of the converter. It is therefore impossible to determine whether a change in the harmonic content of the filter current is caused by a control angle change in the converter or by a defective sectional capacitor in the capacitor battery of the filter circuit.

It is, therefore, an object of this invention to provide a monitoring system for an LC filter circuit in an AC power network which is simple to construct and reliably indicates the failure of one or more sectional capacitors.

SUMMARY OF THE INVENTION

The foregoing and other objects are achieved by this invention which provides a system for monitoring the capacitor batteries of a filter circuit in an AC power network, which is provided with an electronic simulator for determining the fundamental frequency component of a simulated filter current, and a transient reference circuit for comparing the simulated fundamental frequency component of the filter current with a measured fundamental frequency component.

In one embodiment of the invention, current measuring transformers are provided for measuring the phase current of the filter circuit. The current measuring transformers are coupled to low pass filters which suppress the characteristic harmonics. The outputs of the low pass filters are rectified so as to provide a DC voltage which is proportional in amplitude to the magnitude of the measured fundamental frequency component of the phase current. Voltage measuring transformers measure the network phase voltages which are applied to the filter circuit. Each such voltage measuring transformer, in a multi-phase system, is coupled to an electronic filter simulator which is coupled at its output to further low pass filter circuitry for suppressing the harmonic content in the output signals of the electronic filter simulators. The low pass filtered signals are conducted to respective further rectifier circuits which produce corresponding DC voltages which are proportional in amplitude to the magnitude of the fundamental frequency component of the simulated phase current.

Transient comparator circuits compare the measured and simulated phase currents, and are coupled at their outputs to triggering circuitry.

In the inventive monitoring system, the fundamental frequency component of the current which flows through the LC filter circuit is the signal which is evaluated to determine the failure of sectional capacitors. The electronic simulators provide a reference signal which corresponds to the fundamental frequency component of the current in the undisturbed state. This reference signal is compared with the fundamental frequency component of the measured filter or capacitor current. Deviations in the magnitudes of these signals indicates that a defect of a sectional capacitor has occurred. Such deviations, however, are transiently compared so that only relatively fast changes between the simulated and measured fundamental frequency components of the current are evaluated as defect signals. Relatively slow changes, which may be caused by the influence of temperature, will not lead to a defect indication.

It is a feature of the subject invention that the monitoring system can be used for single-phase LC filter circuits, as well as multi-phase filter circuits.

BRIEF DESCRIPTION OF THE DRAWINGS

Comprehension of the invention is facilitated by reading the following detailed description in conjunction with the annexed drawings in which.

DETAILED DESCRIPTION

Figures 1, 2, 4:
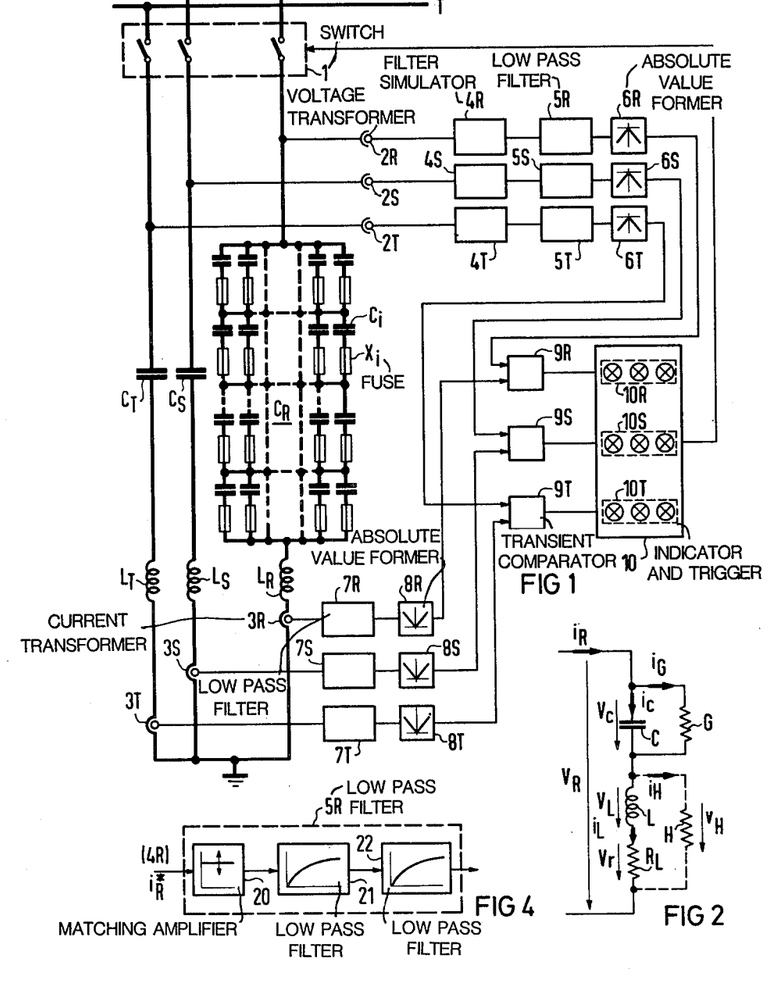
FIG. 1 is a block and schematic representation of a monitoring system constructed in accordance with the principles of the invention, for the capacitor batteries of a three-phase filter circuit.
FIG. 2 is a schematic diagram of a equivalent circuit of an LC filter circuit.
FIG. 4 is a block and line representation of a low pass filter section 5R, employed in FIG. 1.

FIG. 1 shows an embodiment of a monitoring circuit constructed in accordance with the invention, for capacitor batteries $C_R$, $C_S$, $C_T$, of a three-phase filter circuit wherein the filter legs are connected to a three-phase bus bar having phases RST, by a switching device 1.

The three-phase filter circuit consists of three LC series resonant circuits which are connected in a Y-circuit configuration and connected to ground at the common node. The LC series resonant circuits are each tuned to the frequency of a characteristic harmonic.

Capacitor batteries $C_R$, $C_S$, $C_T$, of the three-phase filter circuit, each consists of a multiplicity of parallel legs, each having a plurality of sectional capacitors $C_i$ which are connected in series with respective fuses $X_i$, adjacent ones of the sectional capacitors being connected by continuous cross lines. In order to preserve the clarity of the drawing, only the capacitor battery $C_R$, which corresponds to phase R of the three-phase network, is shown in detail, while the identically constructed capacitor batteries $C_S$ and $C_T$ are represented only by the symbol of a capacitor. In some embodiments, each of the capacitor batteries may contain more than 100 single sectional capacitors. Thus, the failure of a single sectional capacitor has very little effect upon the overall capacitance of the associated capacitor battery, and therefore only very slight variations in the phase current through the affected capacitor battery are produced. Such slight current changes are difficult to detect by measurement in view of the high current strengths of the phase currents which flow through the filter circuit from network conductors RST.

The phase voltage of the LC series resonant circuit containing the capacitor battery $C_R$ and the choke $L_R$ is detected by a potential-isolating voltage measuring transformer 2R. Similarly, the phase voltage of the LC series resonant circuit containing the capacitor battery $C_S$ and choke $L_S$ is measured by a potential-isolating voltage measuring transformer 2S, and the phase voltage of the LC series resonant circuit containing the capacitor battery $C_T$ and choke $L_T$ is measured by a potential-isolating voltage measuring transformer 2T. Thus, voltage measuring transformers 2R, 2S, and 2T produce at their outputs test voltages proportional to the respective phase voltages, such test voltages being at voltage levels which are suitable for signal processing. In some embodiments, potential-isolating voltage measuring transformers 2R, 2S, and 2T may be coupled to a signal-processing electronic system. The decoupling which is provided by the potential-isolating voltage measuring transformers between the high-voltage potential at the network, and the low-voltage potential at the electronic signal-processing system, prevents disturbances in the installation from being coupled into the electronic system.

Figure 3:
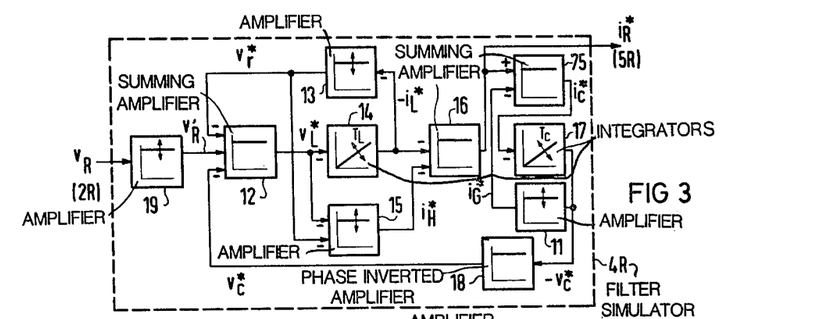
FIG. 3 is a block and line representation of an electronic filter simulator 4R, employed in FIG. 1.

The network phase voltages which are measured by the voltage measuring transformers are conducted to respective electronic filter simulators 4R, 4S, and 4T, which are illustrated and discussed in detail with respect to FIGS. 2 and 3. The resulting simulated filter currents are smoothened in the low pass filter sections 5R, 5S, and 5T, which greatly suppress the harmonic content. The smoothened simulated filter currents are rectified in respective absolute-value formers 6R, 6S, and 6T to produce negative values.

The phase currents are measured as they flow into the neutral node of the Y-circuit by voltage-isolating current measuring transformers 3R, 3S, and 3T. In some embodiments, the current-measuring transformers may be coupled to decoupling amplifiers. The measured phase currents are conducted to respective low pass filters 7R, 7S, and 7T, which correspond in design and function to low pass filters 5R, 5S, and 5T. Low pass filters 7R, 7S, and 7T produce a phase shift for their respective fundamental frequency components of the measured battery currents, the smoothened measured values being rectified by respective absolute-value formers 8R, 8S, and 8T, which are configured to produce positive signal values.

The fundamental frequency components of the measured phase currents are compared with the fundamental frequency components of the simulator filter currents in transient comparator circuits 9R, 9S, and 9T. The transient comparator circuits are coupled to indicator and triggering circuit 10 having phase indicators 10R, 10S, and 10T. The design of transient comparator circuit 9R is discussed in detail with respect to FIG. 6.

FIG. 2 shows an equivalent circuit diagram of an LC series resonant circuit having a capacitance C of a capacitor battery, a DC conductance G of the capacitor battery, an inductance L of the choke, a DC resistance $R_L$ of the choke, and a high-pass resistance H of the choke. The currents and voltages in the equivalent circuit are respectively identified.

FIG. 3 is a block and line representation of an electronic filter simulator 4R, which will be described with reference to the equivalent circuit diagram of FIG. 2. Electronic filter simulator 4R contains a matching amplifier 19 having adjustable gain which is driven at its input by a measured phase voltage $v_R$. A matched phase voltage $-v_R'$ is provided to a summing amplifier 12 together with a simulated capacitor voltage drop $v_C^*$ and a simulated voltage drop $v_r^*$ across the DC resistance $R_L$ of the choke. From these input parameters, summing amplifier 12 determines a simulated choke voltage drop $v_L^*$ in accordance with:

$$v_L^* = -(-v_R' + v_r^* + v_c^*) \qquad \text{Eq. 1}$$

The simulated choke voltage drop $v_L^*$ is supplied to an integrator 14 having an adjustable integration time constant $T_L$, which ascertains a simulated choke current $-i_L^*$ according to:

$$-i^*_L(t) = \frac{-1}{T_L} \int_0^t v^*_L(\tau)d\tau \qquad \text{Eq. 2}$$

The simulated choke current $-i_L^*$ is transformed in an amplifier 13 with adjustable gain into a simulated voltage drop $v_r^*$ across DC resistance $R_L$ of the choke according to:

$$v_r^* = -(-i_L^* \, R_L) \quad \text{Eq. 3}$$

A further amplifier 15 having adjustable gain is provided for simulating the high-pass resistance H. Further amplifier 15 is provided at its input with the simulated choke voltage drop $v_L^*$ and the simulated voltage drop $v_r^*$ across DC resistance $R_L$ of the choke. The output voltage of amplifier 15 corresponds to the simulated current $i_H^*$ through the high-pass resistance H in accordance with equation 4. If the filter circuit is not a high-pass filter, the gain of amplifier 15 is adjusted so that its output voltage is always zero.

$$-i_H^* = -(v_r^* + v_L^*)/H \quad \text{Eq. 4}$$

A summing amplifier 16 is provided for determining the simulated phase current $i_R^*$ according to equation 5, below. Summing amplifier 16 receives at its input the simulated choke current $-i_L^*$ and the simulated current $-i_H^*$ through high-pass resistance H.

$$i_R^* = -(-i_H^* - i_L^*) \quad \text{Eq. 5}$$

The difference between simulated phase current $i_R^*$ and a simulated current $-i_G^*$ through the DC conductance G of the capacitor battery at the input of an integrator 17, is formed and integrated to determine the simulated capacitor voltage drop. Integrator 17, having an adjustable integration time constant $T_C$, conforms to equation 6, as follows, to produce the simulated capacitor voltage drop:

$$-v_c^*(t) = \frac{-1}{T_c} \int_0^t (i_R^*(\tau) - i_G^*(\tau)) d\tau \quad \text{Eq. 6}$$

The simulated capacitor voltage drop $v_C^*$ across capacitor battery $C_R$ is conducted by a phase-inverted amplifier 18 to an input of summing amplifier 12, and by an amplifier 11 having adjustable gain, to integrator 17. Amplifier 11 simulates the DC conductance G of the capacitor battery. The usable frequency range of the operational amplifiers of the filter model may be enhanced by advantageously wiring the operational amplifiers with so-called "feed forward damping".

FIG. 4 is a function block diagram of an embodiment of low pass filter 5R. The simulated filter current $i_R^*$ is conducted by a matching amplifier 20 having variable gain to a two-section filter stage having low pass filters 21 and 22. Low pass filters 21 and 22 are designed so as to achieve an advantageous damping characteristic wherein the eleventh and thirteenth harmonics are suppressed to less than 1%, while the fundamental frequency component is attenuated by only approximately 50%.

Figure 5:
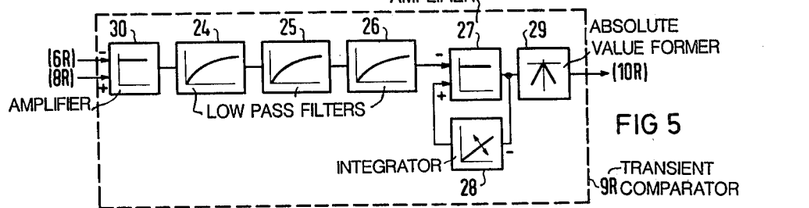
FIG. 5 is a block and line representation of a transient compartor circuit 9R, employed in FIG. 1.

FIG. 5 is a block and line representation of transient comparator circuit 9R, shown in FIG. 1. The rectified fundamental frequency component of the simulated filter current from rectifier circuit 6R, and the rectified fundamental frequency component of the measured phase current from rectifier circuit 8R are conducted to respective inputs of an amplifier 30, in FIG. 5. Amplifier 30 is coupled at its output to a three-stage filter section having low pass filters 24, 25, and 26. The three-stage filter section converts the input signal into a DC quantity, so as to compare only the amplitudes of the simulated and measured phase current with one another.

As noted, temperature variations in the capacitor batteries can cause slow changes in the phase currents of the filter circuit. The simulated phase currents, however, do not vary in response to temperature variations. Gradual deviations between the magnitudes of a simulated and measured phase current do not indicate a defect in a capacitor battery, and are therefore suppressed. For this purpose, the three-phase filter sections 24, 25, and 26 are followed by a differentiator circuit having an amplifier 27, and an integrator 28 connected in a feedback configuration. The differentiator formed of elements 27 and 28 produces at its output pulses in response to sudden phase current changes which are conducted to a triggering circuit 10. Such output pulses are eventually reduced to zero by the operation of the differentiator. The differentiator is coupled at its output by an absolute-value former 29 which rectifies the output signal of the differentiator to form negative values. Such rectification is necessitated by the fact that the differentiator can produce pulses of negative and positive polarities. In this embodiment, the output signal of absolute-value former 29 is conducted to triggering circuit 10.

Figure 6:
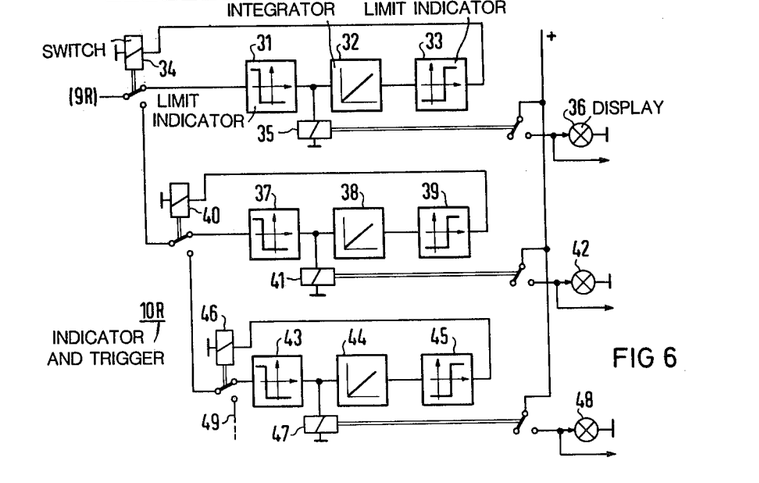
FIG. 6 is a block and line representation of indicating an triggering circuitry 10R, employed in FIG. 1.

FIG. 6 is a block and line representation of phase indicator circuit 10R of the indicating and triggering circuit 10, shown in FIG. 1. The rectified reference signal from comparator circuit 9R is conducted by a switching device 34 to a first counting stage which comprises an input-side limit indicator 31 which is coupled at its output to an integrator 32. Integrator 32 is coupled at its output to a further limit indicator 33 which conducts a signal to switching device 34. A switching relay 35 is coupled to the output of limit indicator 31, and activates an indicator 36. The remaining counting stages which contain elements 37 to 42, or 43 to 49, respectively, are constructed similarly to the described counting stage having elements 31 to 36. Input-side limit indicators 31, 37, and 43 of the individual counting stages are adjusted so as to have identical threshold values.

Phase indicator 10R of phase R operates as follows:

If a defect occurs in a sectional capacitor $C_i$ in capacitor battery $C_R$, a corresponding pulse is received at the input to limit indicator 31, by means of a contact of switching device 34 which, as shown in FIG. 6, couples the output of transient comparator circuit 9R to the input of limit indicator 31. Such a pulse causes limit indicator 31 to respond. The lighting of display 36 will indicate a first defective sectional capacitor in phase R. After limit indicator 31 has responded, integrator 32 accumulates a signal until its output voltage reaches the response threshold of the further limit indicator 33. The output signal of further limit indicator 33 switches the switching device 34, so that the output of transient comparator 9R is coupled through the switching contact of switching device 40 to the second counting stage. The integration time of integrator 32 in the first counting stage is adjusted so as to be in the order of magnitude of few seconds, while the down-integration time is considerably less than one second. The integration time is selected to be longer than the maximum time required for a fuse $X_i$ to open after a short circuit caused by a defective sectional capacitor occurs. The down-integration time determines the length of time that one must push a reset button (not shown) to acknowledge the fault indication after the capacitor fault has been corrected.

In the event that a second sectional capacitor becomes defective, the second counting stage having elements 37 to 41 is actuated, if the indication of the first counting stage was not acknowledged. Such a defective second sectional capacitor is indicated by the lighting of display 42. If limit indicator 37 in the second counting stage has responded, integrator 28 accumulates a signal until its output voltage reaches the response threshold of further limit indicator 39. In response, further limit indicator 39 switches a switching device 40, so that the output of transient comparator circuit 9R is coupled to the third counting stage having elements 43 to 47. The integration time and the down-integration time of integrator 38 and the response thresholds of limit indicators 39 and 45, preferably have the same value as the first counting stage. If a third sectional capacitor becomes defective, the third counting stage having elements 43 to 47 is actuated, if the fault indications of the first and second counting stages are not acknowledged. The third defective sectional capacitor is indicated by the lighting of diplay 48.

The counting stages in the indicating and triggering circuit 11 make possible a staggered monitoring strategy. Thus, if only one sectional capacitor is signalled to be defective, the filter circuit can remain in operation until the next regular servicing. However, if two defective sectional capacitors are signalled, the filter circuit can remain in operation for only a limited time, which may be the length of time which is required for maintenance personnel to be available to effect repair. Finally, if three defective sectional capacitors are signalled, the filter circuit must be immediately disconnected from the network. The signals which actuate indicators 36, 42, and 48 can be conducted in parallel to a command device (not shown), which will effect immediate disconnection of the filter circuit from the network.

Figure 7:
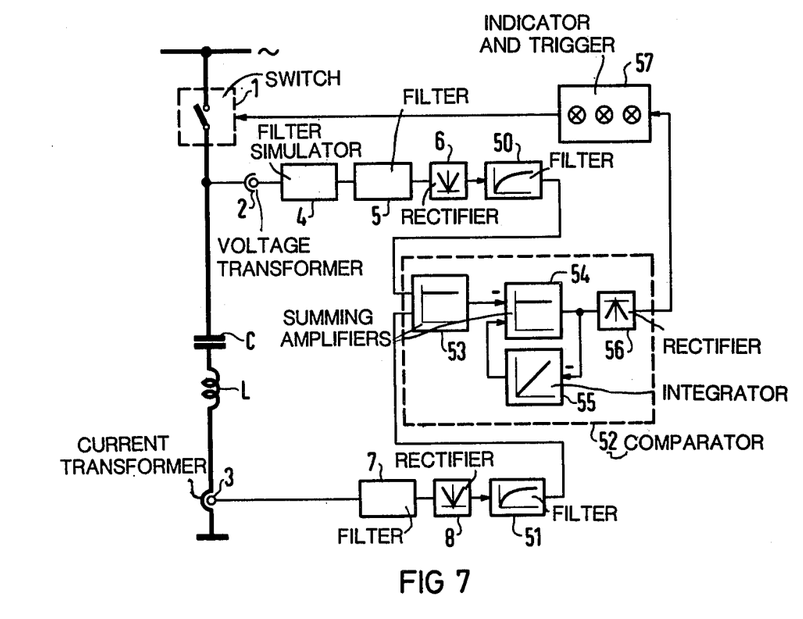
FIG. 7 is a block and schematic representation of a monitoring system constructed in accordance with the principles of the invention for a single-phase filter circuit.

FIG. 7 shows a schematic and block representation of a monitoring circuit constructed in accordance with the principles of the invention. Function blocks in this figure which have functional correspondence to function blocks in FIGS. 1 through 6, are similarly identified.

A single-phase LC filter circuit is shown in FIG. 7, which is connected to an AC power network by a switching device 1. A voltage measuring transformer 2 measures the filter voltage, while a current measuring transformer 3 measures the filter current. A simulated filter current is determined from the measured filter voltage by an electronic filter simulator 4. Electronic filter simulator 4 is coupled at its output to a filtering section 5 which suppresses the harmonic frequencies and furnishes at its output the fundamental frequency component of the simulated filter current. The measured filter current at the output of current measuring transformer 3 is conducted to a filter section 7 which is identical to filter section 5. Filter section 7 provides at its output the fundamental frequency component of the measured filter current. The fundamental frequency component of the simulated and measured filter currents are converted to DC quantities in respective rectifiers 6 and 8. Rectifiers 6 and 8, which operate as absolute value formers, are coupled at their output to respective filter sections 50 and 51 which may have several stages as shown in FIG. 4, or as in FIG. 5 for low-pass filters 24, 25, and 26. The transient comparison of the DC quantities proportional to the amplitudes of the fundamental frequency components of the simulated and measured filter currents is performed in a comparator 52. Comparator 52 contains a differential amplifier 53 which produces at its output a signal corresponding to the difference between the outputs of filter sections 50 and 51. Differential amplifier 53 is coupled at its output to a differentiator having an amplifier 54 and an integrator 55 which is connected in a feedback configuration. The differentiator circuit having amplifier 54 and integrator 55 is coupled to an absolute value former, the output of which corresponds to the output of comparator 52. Comparator 52 is coupled at its output to an indicating and triggering circuit 57, the design of which is similar to the counting stage in the indicating and triggering circuit 10 shown in FIG. 6.

The monitoring system of FIG. 7 differs from the monitoring system of FIG. 1, in that, in FIG. 7, DC quantities are compared with one another in comparator 52. On the other hand, the monitoring system of FIG. 1 utilizes comparators 9R, 9S, and 9T to compare the fundamental frequency components of the simulated and measured filter currents with one another, the resulting difference signal being smoothened in filter sections 24, 25, and 26, shown in FIG. 5. The comparison of the fundamental frequency components of the simulated and measured filter currents is possible because such components are in phase with one another. Thus, the monitoring system of FIG. 1 can utilize simpler circuitry than the monitoring system of FIG. 7.

Figure 8:
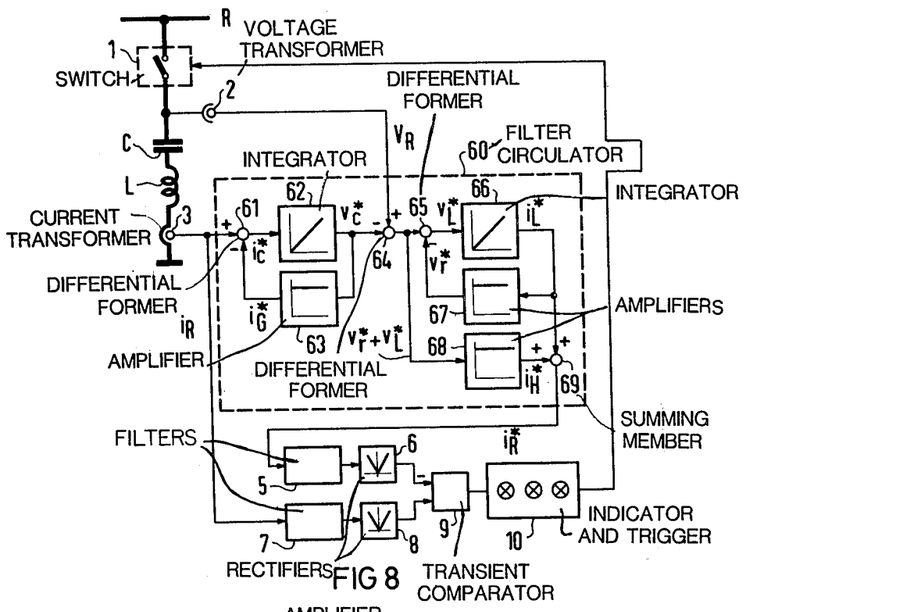
FIG. 8 is a block and schematic representation of a further embodiment of a monitoring system for a single-phase filter circuit constructed in accordance with the principles of the invention.

FIG. 8 shows a schematic and block diagram of a further embodiment of a monitoring system, constructed in accordance with the principles of the invention, for a single-phase LC filter circuit. This system contains an electronic filter simulator 60 which determines the filter current in the undisturbed state from the measured filter current $i_R$ and the measured filter voltage $V_R$. Electronic filter simulator 60, which is shown in FIG. 8 in the form of a function block diagram, will be described hereinbelow with reference to the equivalent circuit shown in FIG. 2.

Phase conductor R of an AC power network is connected to an LC filter circuit by a switching device 1. A voltage measuring transformer 2 measures the filter voltage $V_R$, and a current measuring transformer 3 measures the filter current $i_R$. Both measured values are conducted to electronic filter simulator 60. Electronic filter simulator 60 contains a differential former 61 which receives at a noninverting input terminal a signal corresponding to the measured filter current $i_R$, from current measuring transformer 3. Electronic filter simulator 60 further receives at a inverting input terminal the simulated current $i_G*$ from an amplifier 63 having variable gain which simulates the conductance G of capacitor battery C. The current difference formed by differential former 61, which respresents the simulated capacitor current $i_C*$, is converted in an integrator 62, which has a variable integration time constant, into the simulated capacitor drop $v_c*$. The simulated capacitor voltage drop $v_c*$ is converted by amplifier 63, which simulates the conductance G of the capacitor battery, into the simulated current $i_G*$. A further differential former 64 receives the simulated capacitor voltage drop $v_c*$ at an inverting input terminal, so as to subtract this value from measured filter voltage $V_R$. The difference between these values corresponds to the sum of the simulated voltage drop $v_r*$ at the DC resistance of inductance L, and the simulated voltage drop $v_L*$ across inductor L. The quantity is conducted to a third differential former 65. Third differential former 65 subtracts from this quantity the simulated voltage drop $v_r^*$ across the DC resistance R of inductance L. Thus, differential former 65 produces at its output a signal corresponding to the simulated voltage drop $v_L^*$ across inductance L, which is conducted to a further integrator 66 having a variable integration time constant. Further integrator 66 converts the simulated voltage drop $v_L^*$ into the simulated current $i_L^*$ through the inductance L. The simulated current $i_L^*$ is converted in an amplifier 67 having variable gain into the simulated voltage drop $v_r^*$ across the DC resistance R of the inductance L, this quantity, as noted, being returned to differential former 65. If the LC filter circuit has a high pass resistance H, a further amplifier 68 and a summing stage 69 simulate this high pass resistance. The sum $v_R^* + v_L^*$ is conducted to further amplifier 68. The output voltage of amplifier 68, which represents current $i_H^*$ through the high pass resistance H, is added to the simulated current $i_L^*$ in summing member 69. Summing member 69 produces at its output a signal corresponding to the simulated filter current $i_R^*$.

The remaining elements of structure in the monitoring system of FIG. 8 have analogous elements of structure in the monitoring system of FIG. 1. The simulated filter current $i_R^*$ is conducted to a filter section 5 which provides at its output the fundamental frequency component of the simulated filter current. This fundamental frequency component is rectified in an absolute value former 6 and conducted to a comparator circuit 9. In similar manner, the measured filter current $i_R$ is conducted to a filter section 7 which is coupled at its output to an absolute value former 8, and consequently to a further input terminal of comparator circuit 9. Transient comparator circuit 9 is of the design shown in FIG. 5 and actuates indicating and triggering circuit 10. The output signal of indicating and triggering circuit 10 operates switching device 1 so as to separate the LC filter circuit from the network in the event of a corresponding disturbance.

Figure 9:
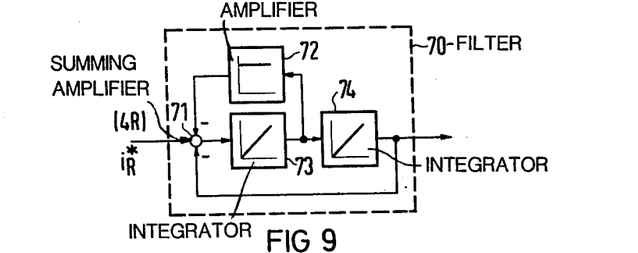
FIG. 9 is a block and line representation of a further embodiment of a filter section.

FIG. 9 shows an alternative filter section 70 to that shown in FIG. 4. The filter circuit of FIG. 9 can be used instead of the filter sections 5, 7, 24, 25, and 26. Filter section 7 is designed as a resonant filter and contains a summing amplifier 71, an integrator 73 having an amplifier 72 in a feedback configuration, and a further integrator 74. The input signal to filter section 70, which may be simulated filter current $i_R^*$ from filter simulator 4R in FIG. 1, is conducted to a noninverting input of summing amplifier 71. Summing amplifier 71 receives at corresponding inverting input terminals the output signal of resonant filter 70, and the output signal of integrator 73 which is conducted through amplifier 72. The output signal of summing amplifier 71 is conducted to the first integrator 73, which is coupled at its output to the second integrator 74.

Although the inventive concept has been disclosed in terms of specific embodiments and applications, other embodiments and applications, in light of this teaching, will be obvious to persons skilled in the pertinent art. For example, the monitoring systems which are shown in this disclosure to be used for single-phase networks, such as those shown in FIGS. 7 and 8, can be expanded for use in three-phase filter circuits, as shown in FIG. 1, without departing from the scope of the invention. The drawings and descriptions in this disclosure are illustrative of the principles of the invention, and should not be construed to limit the scope thereof.

What is claimed is:

1. A monitoring system for an LC filter circuit connected to an AC power network, the LC filter circuit having a capacitor battery of the type having a plurality of parallel legs, each leg having a plurality of sectional capacitors connected in series with respective fuses, adjacent ones of the sectional capacitors being coupled to one another, the system further comprising:
   electronic simulator means for determining the fundamental frequency component of a simulated filter current; and
   transient comparator means for comparing said fundamental frequency component of said simulated filter current with a fundamental frequency component of a measured filter current.

2. The monitoring system of claim 1 wherein there are further provided:
   current measuring transformer means for producing a signal corresponding to said measured filter current;
   low-pass filter means for suppressing a harmonic frequency content of said measured filter current;
   rectifier means for producing a DC voltage signal proportional to said fundamental frequency component of said measured filter current;
   voltage measuring transformer means for producing a voltage measuring signal corresponding to the magnitude of a network voltage applied to the filter circuit;
   electronic filter simulator means for producing a signal corresponding to said simulated filter current in response to said voltage measuring signal;
   further low-pass filter means for suppressing a harmonic content of said signal corresponding to said simulated filter current;
   further rectifier means for producing a DC signal corresponding to a fundamental frequency component of said signal corresponding to said simulated filter current;
   transient comparator means for comparing said signals corresponding to said measured and simulated filter currents; and
   indicating and triggering circuit means for producing an indication in response to said comparison in said transient comparator means.

3. The monitoring system of claim 1 wherein said electronic simulator means further comprises:
   summing amplifier means for determining a simulated voltage drop across the inductance in the filter, said simulated voltage drop across the inductance being responsive to a summation of a simulated capacitor voltage drop, a measured network voltage, and a simulated voltage drop across a DC resistance of the inductance;
   integrator means for determining a simulated inductor current, said integrator means being coupled at its input to an output terminal of said summing amplifier means;
   amplifier means coupled to said integrator means for determining said simulated voltage drop across said DC resistance of the inductance;
   further amplifier means responsive to said summing amplifier means and said amplifier means for determining a simulated high pass resistance current through a high pass resistance;
   further summing amplifier means responsive to said integrator means and said further amplifier means, for determining a simulated filter current; and integrator means for determining said simulated capacitor voltage drop, said integrator means being responsive to a differential former, said further summing amplifier, and a feedback amplifier.

4. The monitoring system of claim 1 wherein there are further provided:
amplifier means for receiving first and second DC voltage signals responsive to said simulated and measured filter currents;
filter means formed of a plurality of low-pass filters coupled to said amplifier means for converting an output signal of said amplifier means into a DC quantity; and
differentiator means for generating an output signal in the event of sudden filter current changes, said output signal being responsive to said DC quantity from said filter means.

5. The monitoring circuit of claim 1 wherein there are further provided:
difference former means for determining a simulated capacitor current, said simulated capacitor current being responsive to said measured filter current and a simulated current through a DC conductance of the filter inductor;
integrator means for determining said simulated capacitor voltage drop in response to said simulated capacitor current;
amplifier means for determining a simulated current through a DC conductance of the inductor of the filter in response to said simulated capacitor voltage drop;
second differential amplifier means for producing a signal corresponding to the difference between said simulated capacitor voltage drop and said measured filter voltage;
third difference former means for determining said simulated voltage drop of the inductor in the filter in response to said signal of said second differential amplifier means, and a simulated voltage drop across a DC resistance of the inductor of the filter;
integrator means for determining a simulated current through the inductor of the filter in response to said simulated voltage drop across the inductor of the filter;
further amplifier means for determining said simulated voltage drop across said DC resistance of the inductor of the filter in response to said simulated current through the inductor of the filter;
third amplifier means for determining a simulated current through a high pass resistance in response to said signal from said second differential amplifier means; and
summing stage means for determining a simulated filter current from said simulated current through the inductor of the filter and said simulated current through said high pass resistance.

* * * * *